H. C. WADE.
APPARATUS FOR DECOMPOSING HYDROCARBON OILS AND WATER.
APPLICATION FILED JAN. 11, 1916.
1,336,450. Patented Apr. 13, 1920.
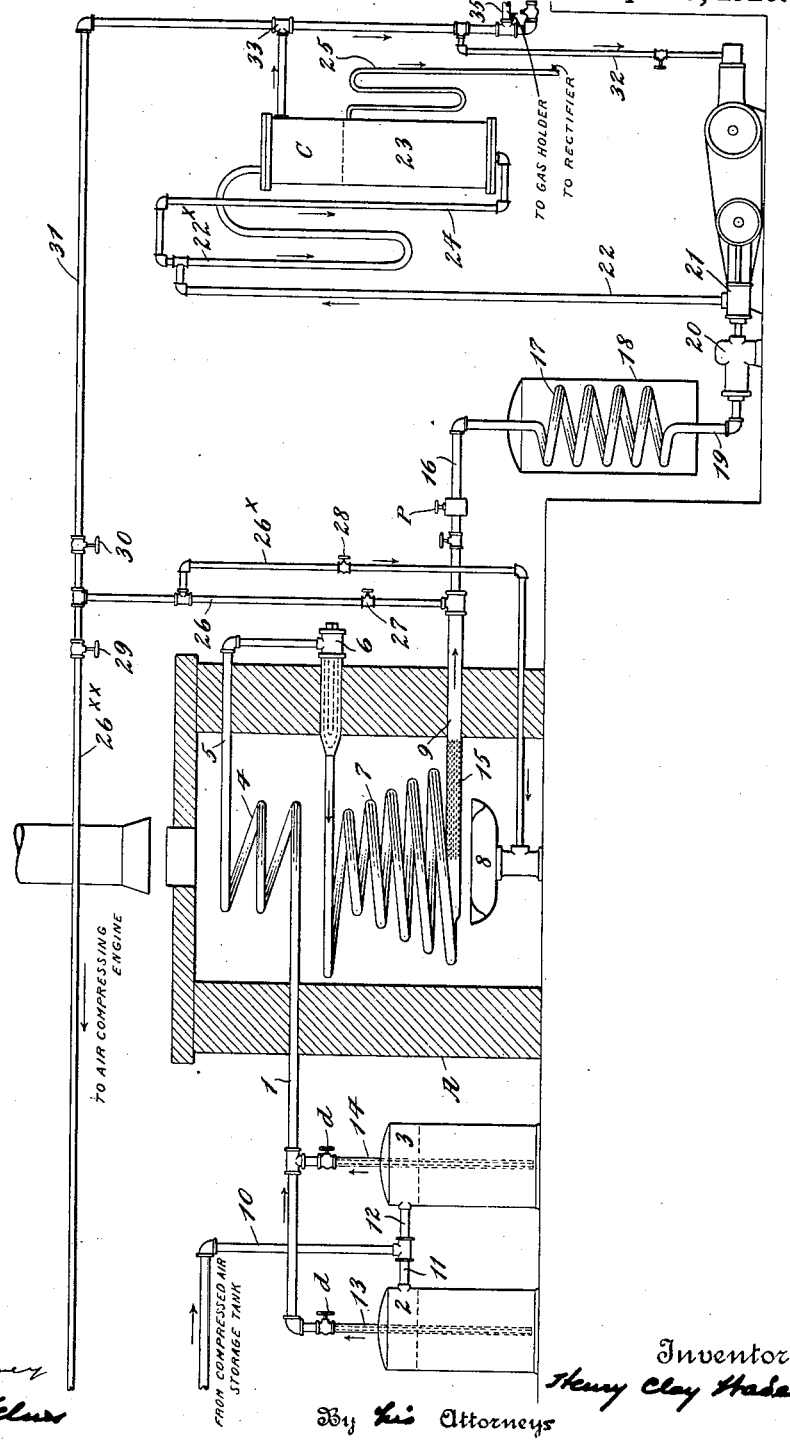

UNITED STATES PATENT OFFICE.

HENRY CLAY WADE, OF BAYONNE, NEW JERSEY, ASSIGNOR, BY MESNE ASSIGNMENTS, TO WADOL CORPORATION, A CORPORATION OF NEW YORK.

APPARATUS FOR DECOMPOSING HYDROCARBON OILS AND WATER.

1,336,450.      Specification of Letters Patent.      Patented Apr. 13, 1920.

Application filed January 11, 1916. Serial No. 71,389.

*To all whom it may concern:*

Be it known that I, HENRY CLAY WADE, a citizen of the United States, residing at Bayonne, in the county of Hudson and State of New Jersey, have invented certain new and useful Improvements in Apparatus for Decomposing Hydrocarbon Oils and Water, of which the following is a specification.

This invention relates to an apparatus for decomposing hydrocarbon oils and water and the formation therefrom of various products, such as fuel and illuminating gas and hydrocarbon oils of different characteristics from the untreated oil.

Broadly, my invention consists in subjecting an interflow of oil and water under pressure to a preheater and thereafter subjecting a spray of the heated oil and water mixture to the upper turn of a generator coil subjected to a high degree of heat, whereby the water is immediately vaporized, the hydrocarbon oil is "cracked" into heavy and light hydrocarbons, and furthermore forcing the vapors of water and light and heavy hydrocarbons through the lower turns of the generator coil and thereafter subjecting the hydrocarbon water vapors and vapors to the increased temperature produced by a catalyzer which further cracks the heavy hydrocarbon vapors into lighter hydrocarbons, and which also by its catalytic action dehydrogenates part of the saturated hydrocarbons, recombining the hydrogen and carbon atoms into new combinations partly by the subjection of the heated gases to the high temperature of the catalyzer body and partly by positive reactions induced by as yet unknown qualities of the catalyzer at high temperatures.

In a co-pending application Serial No. 141,770, which was filed January 11, 1917, is described a modified method and apparatus for introducing a mixture of oil and steam to the heating coil.

The invention may best be explained by a description of the present embodiment of the apparatus, herein illustrated.

In the drawing, which is largely diagrammatic, an apparatus is shown capable of automatic action from the oil and water storage tanks to the gas and liquid holders. A, represents one refractory wall of a furnace of any suitable construction, and through which penetrates the tube 1 passing from the oil tank 2 and water tanks 3 to the preheating coil 4. The preheating coil 4 communicates with a pipe 5 leading to the atomizer 6 at the top of and communicating with the gas generator coil 7, the latter being located above a burner 8. An outlet pipe 9 in communication with the lower end of gas generator coil 7 serves to convey the treated gases to the exterior of the furnace and to the condenser, the gas separator, scrubber, etc., hereinafter described.

The oil and water are fed to the preheater coil in the following manner: 10 indicates a pipe leading from a compressed air tank to a pipe 11 entering the oil tank 2, and second pipe 12 entering the water tank 3, each of the said pipes 11 and 12 being provided with a valve c whereby the degree of air pressure in each tank may be regulated. The air pressures in tanks 2 and 3 must be of such degree that the liquids in said tanks may be sprayed into the gas generator coil under a pressure greater than the pressure of the gases in said generator. The proportions of water fed to the preheater coil may vary according to the nature of the hydrocarbon. I have found that four parts of Texas oil may be mixed with one part water, heavier oil requiring a greater proportion of water. The oil tank is provided with a feed pipe 13 communicating with the preheater pipe 1, and the water tank also is provided with a feed pipe 14 communicating with preheater pipe 1. To regulate the relative amounts of oil and water fed into the preheater, each of the feed pipes 13 and 14 is provided with a regulating valve d. It will thus be seen that ample means are provided for feeding to the preheater the exact proportion of oil and water desired and under the exact pressure desired.

In the operation of the apparatus the requisite proportions of oil and water are passed through the preheater and generator coils with a rapidity and pressure which depends upon the air pressure in the oil and water tanks, the action of a suitable automatic pressure valve P and a suction device 21 applied to the outflow pipe 9 and hereinafter referred to.

In order to obtain from the oil under treatment the largest amount of light hydrocarbon oils of high commercial value, it is necessary to apply a high temperature to the lower coils of the gas generator; the preheater, however, being subjected to a lower temperature. The heated oil and water molecules pass from the preheater to the atomizer 6 which propels the molecules in spray form into the gas generator, the upper coils of the latter being heated to such extent that the water is immediately vaporized and the lighter constituents of the oil freed, the vaporization of the oil continuing with rapidly increasing degree as it is forced downwardly and subjected to the successively increasing temperatures of the lower turns of the coil.

One of the primary features of my invention is the provision of a catalyzer within the outflow pipe 9 of the generator and in such position within the furnace as to be subjected to the greatest possible amount of heat from the burner or other heating device. This catalyzer 15 is formed preferably of nickel in metallic form, although I have found that other metals possess substantially the same active characteristics in my process, and therefore I do not limit myself to the use of nickel alone. The catalyzer may be made of woven wire mesh, spirally wound series of connected wires, or of perforated plates or may be otherwise attenuated to increase the surface of the metal in proportion to the mass to such an extent as to cause the desired reaction to take place.

The action of the catalyzer will now be described.

First: As the cracking of the hydrocarbon vapor increases toward the catalyzer, the liberated lighter hydrocarbons leave a residue of carbon (in the form of soot or lamp black); and the water vapor acted upon by the carbon, in the higher temperature of the catalyzer, is decomposed, its oxygen constituent combining with the carbon to form carbon monoxid which, combining with part of the saturated and unsaturated hydrocarbon gases and free hydrogen forms a fixed gas similar in composition to carbureted water gas and of high illuminating and calorific power.

Second: The heated gases in the generator coil back of the catalyzer will be subjected to a much higher temperature when they meet the catalyzer. Now, when the hydrocarbon molecules under pressure are thus suddenly subjected to the higher temperature they are further "cracked" and part of the saturated hydrocarbons of the methane ($CH_4$) series, and unsaturated hydrocarbons of the ethylene ($C_2H_4$) series are converted into gases of the hydrogenated benzol series now recognized as the benzene hexahydrids, or naphthenes. Furthermore, hydrogen and carbon atoms are taken from the atoms of the naphthene gases by the increased temperature, and these gases are directly converted into those of the $C_nH_{2n-6}$ series.

Third: Some of the saturated hydrocarbons are partly dehydrogenized by the catalytic action of the catalyzer and the freed hydrogen and carbon atoms and recombined hydrogen and carbon atoms form gases of the $C_nH_{2n-6}$ series, such as benzol ($C_6H_6$) and toluol ($C_6H_5CH_3$).

The condensed vapors (freed from the fixed carbureted gas) will rectify principally gasolene, benzol and toluol, leaving a small residue of heavy oils.

My apparatus includes means for leading the treated gases to a condenser and thereafter conveying the gas and condensed liquid to a separator and scrubber, from which the gas flows into a gas holder, the condensed liquids being led away for rectification. To this end outflow pipe 9 communicates with the feed pipe 16 of a condenser comprising the condensing coil 17 located in cooling tank 18, the condenser being provided with an outflow pipe 19 leading to condensing trap 20 from which the liquids are conveyed by a vacuum pump 21 to the feed pipe 22 of the separator and scrubber. The separator and scrubber comprises the tank 23 within which is located a suitable scrubbing medium, the fixed gas being led to the bottom of the scrubber by means of a pipe 24 and thence passing through the scrubbing medium to the upper portion of the scrubber from whence the said fixed gas may be conveyed to the gas holder. The condensed liquid is delivered to the scrubber from pipe 22 by means of a pipe 22˟, the liquid being treated in the scrubber in the usual manner and thence conveyed by means of a pipe 25 to a storage tank or rectifier. The scrubber delivers the fixed gas to the gas holder by means of a pipe 35 by which communication is established between pipe 33 and inlet and outlet pipe 36 of the gas holder.

I have discovered that when the temperature in the generator coil 7 is raised to 1200° F. and beyond that the fixed gas produced is greatly increased, and the gases capable of condensation into liquids at ordinary pressure are correspondingly reduced and it is the provision of the catalyzer within the generator coil which makes it possible to so act upon a charge of hydrocarbon oil as to convert 95 per cent. and upward of the bulk into a fixed gas of high calorific properties.

If it is so desired, part of the gases generated in the coils may be conveyed directly to burner 8, and also to a gas engine employed to maintain air pressure in the oil and water tanks. To this end outflow pipe 9 communicates with a pipe 26 having a branch 26˟ leading to the burner 8 and a second branch 26˟˟ leading to the gas engine. Pipe 26 will receive gases directly from the outflow pipe when valve 27 is open. If valve 27 in branch pipe 26˟ is open the gases will flow from the generator coil directly to the gas burner 8. And if valve 29 in branch pipe 26ˣˣ is open, part of the gases will flow through said pipe to the gas engine employed for air compression. If, however, it is desired to use the fixed gas only in the gas burner and air compressing engine, valve 27 is closed and a valve 30 in pipe 31 communicating with the fixed gas chamber C of the scrubber, or a gas holder (not shown) is opened and thereupon the fixed gas will flow from pipe 31 to branch pipes 26ˣ and 26ˣˣ and thence to the burner and air compressing engine.

The gas engine 21 used to convey the gases by suction through condenser 18 and thence to the scrubber, may be fed by the fixed gas. To this end the said engine 21 is provided with a feed pipe 32 leading from gas outflow pipe 33 of the scrubber, or, if desired, the said pipe 32 may communicate directly with the gas holder C.

I have found in practice that the temperature within the generator at which the desired reaction will best take place is from 1400 to 1800° F.

What I claim and desire to secure by Letters Patent of the United States is:—

1. In an apparatus for decomposing hydrocarbon oils and water, a furnace, means in the furnace for vaporizing and preheating oil in the presence of water, a generating coil in the furnace which receives the oil and aqueous vapors from said means, the coil being in the form of a spiral having turns inclined from the inlet to the outlet of the coil, and a mass of attenuated metal located within and substantially at the outlet of the coil.

2. In an apparatus for cracking hydrocarbon oils, a furnace burner within the furnace, a pre-heating coil disposed within the furnace and to which a mixture of oil and water is introduced, a spiral vertically disposed generating coil also disposed within the furnace to which generating coil the pre-heated mixture is introduced, the generating coil being arranged with reference to the said burner to increase the temperature of the mixture in the direction of flow, and a metal catalyzer attenuated in form disposed within the furnace at the outlet end of the generating coil and at a point of greatest heat from said burner.

In testimony whereof I have hereunto signed my name in the presence of two subscribing witnesses.

HENRY CLAY WADE.

Witnesses:
  M. E. McNINCH,
  W. LEE HELMS